(12) United States Patent
Schroeder et al.

(10) Patent No.: US 12,333,941 B2
(45) Date of Patent: Jun. 17, 2025

(54) METHOD AND DEVICE FOR EXCHANGING MANEUVER INFORMATION BETWEEN VEHICLES

(71) Applicant: Robert Bosch GmbH, Stuttgart (DE)

(72) Inventors: Gernot Schroeder, Ludwigsburg (DE); Matthias Haug, Renningen (DE); Maxim Dolgov, Renningen (DE); Thomas Michalke, Weil der Stadt (DE)

(73) Assignee: ROBERT BOSCH GMBH, Stuttgart (DE)

( * ) Notice: Subject to any disclaimer, the term of this patent is extended or adjusted under 35 U.S.C. 154(b) by 303 days.

(21) Appl. No.: 17/777,727

(22) PCT Filed: Nov. 17, 2020

(86) PCT No.: PCT/EP2020/082323
§ 371 (c)(1),
(2) Date: May 18, 2022

(87) PCT Pub. No.: WO2021/110399
PCT Pub. Date: Jun. 10, 2021

(65) Prior Publication Data
US 2023/0005370 A1    Jan. 5, 2023

(30) Foreign Application Priority Data
Dec. 6, 2019  (DE) .................... 10 2019 219 021.9

(51) Int. Cl.
*G08G 1/16* (2006.01)
*G05D 1/00* (2024.01)

(52) U.S. Cl.
CPC ............... *G08G 1/161* (2013.01); *G05D 1/00* (2013.01)

(58) Field of Classification Search
None
See application file for complete search history.

(56) References Cited

U.S. PATENT DOCUMENTS

| | | | | |
|---|---|---|---|---|
| 2018/0257645 | A1* | 9/2018 | Buburuzan | B60W 30/08 |
| 2018/0321689 | A1* | 11/2018 | Lehmann | G08G 1/163 |
| 2018/0373245 | A1* | 12/2018 | Nishi | G05D 1/0088 |

(Continued)

FOREIGN PATENT DOCUMENTS

| | | | | |
|---|---|---|---|---|
| CN | 107705601 A | * | 2/2018 | G08G 1/0962 |
| CN | 108932832 A | * | 12/2018 | G08G 1/202 |

(Continued)

OTHER PUBLICATIONS

Englight translastion of written description of CN-108932832-A, retrieved from Espacenet on May 13, 2024 (Year: 2024).*

(Continued)

*Primary Examiner* — Amelia Vorce
(74) *Attorney, Agent, or Firm* — NORTON ROSE FULBRIGHT US LLP

(57) ABSTRACT

A method for exchanging pieces of maneuver information between vehicles. A parameterizable third-party trajectory planner provided by a third-party vehicle and mapping future pieces of maneuver information of the third-party vehicle are parameterized and executed in an ego vehicle, using at least one time parameter, to obtain at least one future third-party trajectory of the third-party vehicle.

14 Claims, 1 Drawing Sheet

(56) References Cited

U.S. PATENT DOCUMENTS

| | | | |
|---|---|---|---|
| 2019/0044728 A1* | 2/2019 | Karmoose | H04L 9/3242 |
| 2020/0166950 A1* | 5/2020 | Hase | G05D 1/0088 |
| 2020/0239030 A1* | 7/2020 | Kwoczek | G01C 21/3647 |
| 2021/0031800 A1* | 2/2021 | Fuchs | B60W 60/0027 |
| 2022/0089157 A1* | 3/2022 | Ito | G08G 1/22 |
| 2024/0319729 A1* | 9/2024 | Switkes | G08G 1/127 |

FOREIGN PATENT DOCUMENTS

| | | |
|---|---|---|
| DE | 102014211507 A1 | 12/2015 |
| DE | 102015215929 A1 | 2/2017 |
| DE | 102015220481 A1 | 5/2017 |
| DE | 102015221817 A1 | 5/2017 |
| DE | 102018109885 A1 | 12/2018 |

OTHER PUBLICATIONS

International Search Report for PCT/EP2020/082323, Issued Jan. 28, 2021.

\* cited by examiner

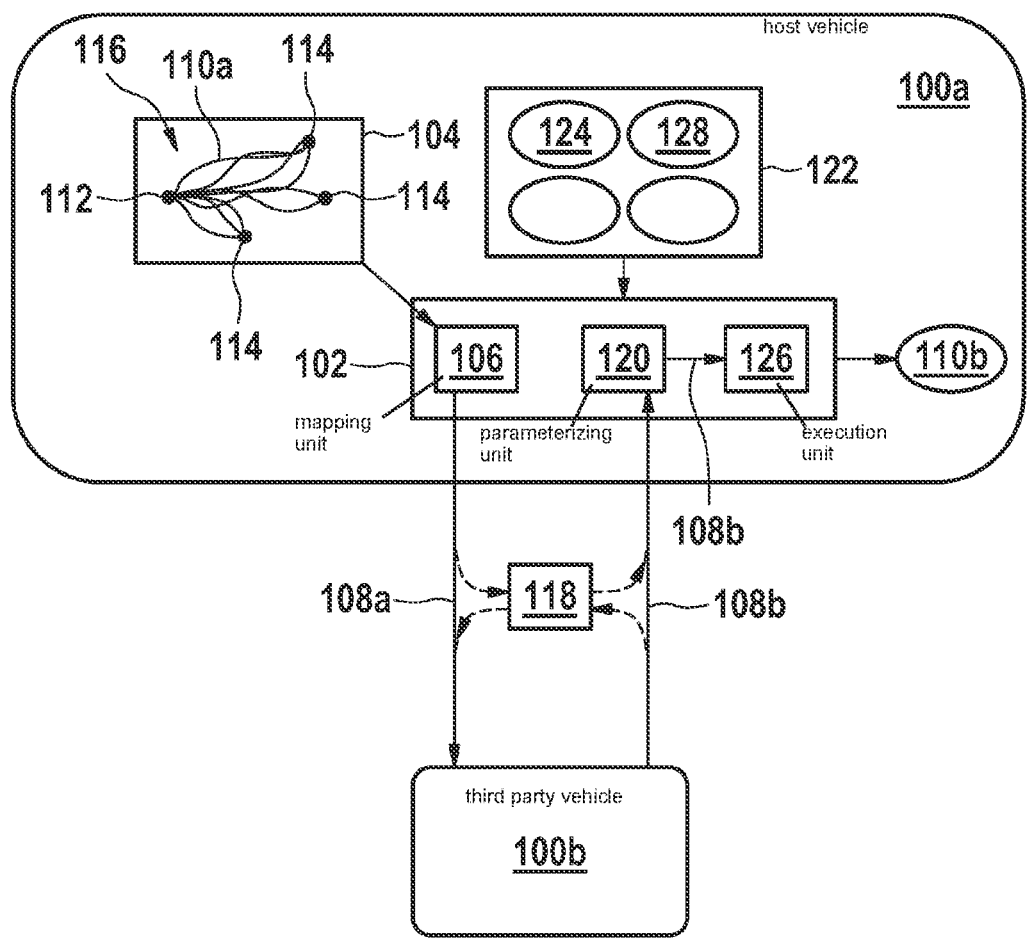

METHOD AND DEVICE FOR EXCHANGING MANEUVER INFORMATION BETWEEN VEHICLES

FIELD

The present invention relates to a method for exchanging pieces of maneuver information between vehicles as well as a corresponding device.

BACKGROUND INFORMATION

Autonomous vehicles and semi-autonomously driving vehicles may coordinate their maneuvers with each other to facilitate a preferably undisturbed traffic flow. For coordination purposes, the vehicles may exchange pieces of maneuver information. The pieces of maneuver information may be planned trajectories, which are calculated by one vehicle and sent as a data packet to the other vehicle and vice versa. The vehicles are thus notified of the planned trajectories of the other vehicle in each case. A collision-free trajectory may be found for each vehicle with the aid of a selection method and a coordination method.

SUMMARY

In accordance with the present invention, a method for exchanging pieces of maneuver information between vehicles and a corresponding device, a corresponding computer program product and a machine-readable memory medium are provided using the approach described here. Advantageous refinements and improvements of the present invention are disclosed herein.

Specific embodiments of the present invention may advantageously make it possible to limit a data volume to be exchanged during the exchange of pieces of maneuver information between autonomous or semi-autonomous vehicles and to additionally increase the size of the information content of the pieces of maneuver information. Alternatively or additionally, the pieces of maneuver information may be provided by the approach described here for a period of time extending farther into the future than during the exchange of precalculated trajectories.

According to a first aspect of the present invention, a method is provided for exchanging pieces of maneuver information between vehicles, pieces of future ego maneuver information of an ego vehicle being mapped in a parameterizable ego trajectory planner for planning at least one ego trajectory of the ego vehicle, and the ego trajectory planner being provided for at least one third-party vehicle.

According to a second aspect of the present invention, a method is provided for exchanging pieces of maneuver information between vehicles, a parameterizable third-party trajectory planner mapping pieces of future third-party maneuver information of a third-party vehicle provided by the third-party vehicle being parameterized and executed in an ego vehicle, using at least one time parameter, for the purpose of obtaining at least one future third-party trajectory of the third-party vehicle.

A method for exchanging pieces of maneuver information between vehicles is further provided, according to the first aspect of the present invention, a parameterizable ego trajectory planner for planning at least one future ego trajectory of an ego vehicle being provided for at least one third-party vehicle, and according to the second aspect of the present invention, at least one parameterizable third-party trajectory planner received from a third-party vehicle being executed in the ego vehicle for planning at least one future third-party trajectory of the third-party vehicle.

Ideas relating to specific embodiments of the present invention may be viewed, among other things, as being based on the considerations and findings described below.

A host vehicle may also be referred to as an ego vehicle. The method presented here is described from the perspective of the ego vehicle. A third-party vehicle may be another vehicle, i.e., a distant road user. The terms "ego" and "third-party" are used here to differentiate terms which otherwise sound the same or have the same meaning.

A piece of maneuver information, i.e., a piece of ego maneuver information or a piece of third-party maneuver information, may map a future behavior of a vehicle. The maneuver information may include a multiplicity of possible trajectories, on which the vehicle may travel from an instantaneous location or, in particular, one in the recent past, to at least one destination to be reached in the future. The trajectories may differ from each other in terms of a location profile or spatially as well as in terms of a velocity profile or acceleration profile. The trajectories may be described by a sequence of reference points or in the form of a function, such as a polynomial. A vector having a velocity and a direction may be assigned to each reference point.

In accordance with an example embodiment of the present invention, a trajectory planner, i.e., an ego trajectory planner or a third-party trajectory planner, may be a calculation rule for the maneuver information. A trajectory planner may be an algorithm, which outputs at least one of the trajectories of the maneuver information as a function of at least one parameter or a variable input parameter. The trajectory planner may be created in a standardized data format. The parameter may also be entered as a value range. The parameter may be, in particular, a time parameter. The time parameter may characterize a calculation point in time of the trajectory planner. The time parameter may also characterize a temporal prediction horizon for the trajectories to be calculated. The time parameter may also be coupled to a position of the vehicle based on an actual movement of the vehicle. The vehicle moves at a real velocity. The time parameter may therefore also be coupled to a velocity of the vehicle. The time parameter may also be entered into the trajectory planner as a future point in time.

Up to now, it has been possible to wirelessly transfer trajectory groups from vehicle to vehicle as a data packet of a piece of maneuver information. The transfer is greatly dependent on a possible transmission speed. To be able to transfer many trajectories in a short period of time, a size of the data packet may be reduced. For example, a resolution of the trajectories may be reduced. Likewise, a length of the trajectories may be limited. The trajectories may thus be transferred with a low prediction horizon.

In accordance with an example embodiment of the present invention, the trajectory planner presented here may also be transferred wirelessly from vehicle to vehicle. The trajectory planner may have a significantly lower memory demand than the data packet of the maneuver information. The trajectory planner may be an executable file. When executing the trajectory planner, one or multiple planned trajectories may be ascertained, in particular calculated, as a function of an instantaneous parameterization. The trajectory planner may be compiled in the sending vehicle and be executed in the receiving vehicle. Alternatively to the compilation, an intermediate representation may be used, which is comparable to a bytecode in the Java programming language. The code may then be executed by an interpreter.

The trajectory planner may output trajectories in a high resolution during the execution in the third-party vehicle. The output resolution may be significantly higher than a resolution of trajectories read out of the data packet.

The trajectories output by the trajectory planner may have a wide prediction horizon. The trajectory planner may therefore be up to date for a longer period of time. The trajectories output by the trajectory planner may have a more distant prediction horizon than trajectories read out from the data packet. Due to the more distant prediction horizon, the trajectory planner may be up to date for a longer period of time than trajectories read out from the data packet.

The third-party trajectory planner may furthermore be parameterized and executed in the ego vehicle, using at least one ego parameter of the ego vehicle. The number of generated trajectories may be limited by the ego parameter, since irrelevant trajectories are not even calculated at all. Only trajectories relevant for the ego vehicle are calculated.

The ego parameter may characterize a planned future ego trajectory of the ego vehicle. The ego parameter makes it possible to generate third-party trajectories which are in the area of a planned ego trajectory of the ego vehicle. Third-party trajectories which are at a distance from the ego trajectory are mapped in the third-party trajectory planner, but are not calculated, due to the at least one ego parameter. The interest may be primarily on collision-free trajectories with respect to the planned ego trajectory. In this way, it may be established for different possible ego trajectories whether collision-free third-party trajectories exist for them to thereby identify a collision-free future possible profile of the traffic situation.

After the execution of the third-party trajectory planner, the time parameter may be updated, and the third-party trajectory planner may be re-parameterized and re-executed in the ego vehicle, using the updated time parameter, to obtain an updated future third-party trajectory of the third-party vehicle. The third-party trajectory planner may also remain up to date after being executed once or multiple times. The output third-party trajectories may change over time. Due to multiple executions, a quantity of transmitted data may be reduced. Due to the high prediction horizon, the output third-party trajectories may be subsections of the maneuver information of the third-party vehicle mapped in the third-party trajectory planner.

The third-party trajectory planner may be received from the third-party vehicle in coded form and be decoded prior to being parameterized and executed in the ego vehicle. The third-party trajectory planner may be encrypted to protect the third-party maneuver information or the algorithm for the calculation of third-party trajectories against unauthorized access. The third-party trajectory planner may be transferred as a black box. The third-party trajectory planner may have been generated and encrypted individually for the ego vehicle. A limited portion of the pieces of third-party maneuver information may be mapped in the received third-party trajectory planner. The vehicles may carry out, for example, a handshake for exchanging pieces of encryption information. The ego trajectory planner may be provided by the ego vehicle in coded or encrypted form. The ego trajectory planner may be created individually for the third-party vehicle. Only the portion of the maneuver information relevant for the third-party vehicle may be mapped in the ego trajectory planner.

A simplified surroundings representation of surroundings of the ego vehicle may be mapped in the ego trajectory planner. The vehicle may monitor the surroundings with the aid of sensors. The surroundings monitoring may recognize and classify objects. A recognized object may be classified, for example, as an obstacle. Obstacles and a recognized profile of the roadway may be contained in the surroundings representation. The surroundings representation may also contain recognized road users. An improved maneuver coordination may take place, based on the surroundings representation.

Multiple possible future ego trajectories of the maneuver information may be evaluated in the ego vehicle, and an evaluation of the ego trajectories may be mapped in the ego trajectory planner for the third-party vehicle. Preferred trajectories or undesirable trajectories may be made known by an evaluation. The evaluation may take place in the form of costs assigned to the particular trajectory. Preferred trajectories may have low costs, while undesirable trajectories have high costs. A maneuver coordination may be optimized by the evaluation.

The pieces of maneuver information mapped in the ego trajectory planner for the third-party vehicle may be simplified. For example, the pieces of maneuver information may be idealized.

For example, the ego trajectory for the ego vehicle may run in the middle of a lane. A space required by the ego vehicle may be mapped by a placeholder. The data quantity may be reduced by the simplification.

The method may be implemented, for example, in software or hardware or in a mixed form of software and hardware, for example in a control unit.

The present invention further provides a device which is designed to carry out, activate or implement the steps of one variant of the method presented here in corresponding equipment.

The device may be an electrical device including at least one processing unit for processing signals or data, at least one memory unit for storing signals or data, and at least one interface and/or one communication interface for reading in or outputting data embedded in a communication protocol. The processing unit may be, for example, a signal processor, a so-called system ASIC or a microcontroller for processing sensor signals and outputting data signals as a function of the sensor signals. The memory unit may be, for example, a flash memory, an EPROM or a magnetic storage unit. The interface may be designed as a sensor interface for reading in the sensor signals from a sensor and/or as an actuator interface for outputting the data signals and/or control signals to an actuator. The communication interface may be designed to read in or output the data wirelessly and/or in a hard-wired manner. The interfaces may also be software modules, which are present, for example, on a microcontroller alongside other software modules.

In accordance with the present invention, a computer program product or computer program, including program code, is also advantageous, which may be stored on a machine-readable carrier or memory medium, such as a semiconductor memory, a hard disk memory, or an optical memory, and is used for carrying out, implementing and/or activating the steps of the method according to one of the specific embodiments described above, in particular when the program product or program is executed on a computer or a device.

It is pointed out that some of the possible features and advantages of the present invention are described herein with reference to different specific embodiments. Those skilled in the art recognize that the features of the device and the method may be suitably combined, adapted or exchanged to obtain further specific embodiments of the present invention, in view of the disclosure herein.

BRIEF DESCRIPTION OF THE DRAWING

Specific embodiments of the present invention are described below with reference to the FIGURE, with neither the FIGURE nor the description herein to be interpreted as limiting the present invention.

FIG. 1 shows a representation of a vehicle, including a device, according to one exemplary embodiment of the present invention.

The FIGURE is only schematic and not true to scale. The same reference numerals designate the same or functionally equivalent features in the FIGURE.

DETAILED DESCRIPTION OF EXAMPLE EMBODIMENTS

FIG. 1 shows a representation of an ego vehicle 100a, including a device 102, according to one exemplary embodiment. Device 102 is designed to exchange pieces of maneuver information 104 between ego vehicle 100a and at least one third-party vehicle 100b. Host vehicle 100a may also be referred to as ego vehicle 100a. Third-party vehicle 100b may also be referred to as traffic vehicle 100b. Third-party vehicle 100b also includes a corresponding device, which is not illustrated here, for exchanging pieces of maneuver information.

Devices 102 each include a mapping unit 106. Mapping units 106 each map pieces of maneuver information 104 in a parameterizable algorithm referred to as a trajectory planner 108. Pieces of maneuver information 104 each include possible future trajectories 110 of vehicles 100. A future possible trajectory 110 of ego vehicle 100 may be referred to as ego trajectory 110a. A future possible trajectory 110 of third-party vehicle 100b may be referred to as third-party trajectory 110b. The different trajectories 110 of a piece of maneuver information 104 all essentially begin at same starting point 112 and may lead to different destinations 114.

Trajectories 110 of a piece of maneuver information 104 may be referred to as a trajectory group 116. Trajectory planner 108 of ego vehicle 100a may be referred to as ego trajectory planner 108a. Trajectory planner 108 generated in third-party vehicle 100b may be referred to as third-party trajectory planner 108b.

Ego trajectory planner 108a is transferred wirelessly to third-party vehicle 100b. Ego trajectory planner 108a may also be sent from ego vehicle 100a to third-party vehicle 100b, for example, via a higher-level data processing unit 118, such as a cloud server. The data transfer for third-party trajectory planner 108b of third-party vehicle 100b correspondingly takes place in the opposite direction.

Third-party trajectory planner 108b is received by device 102. Third-party trajectory planner 108b is parameterized in a parameterizing unit 120 of device 102, using at least one parameter 122. Parameter 122 may be, in particular, a time parameter 124. Time parameter 124 defines a point in time of interest. For example, time parameter 124 may map a future point in time.

Parameterized third-party trajectory planner 108b is an executable computer program product. Parameterized third-party trajectory planner 108b is executed in an execution unit 126 of device 102. Execution unit 126 outputs at least one third-party trajectory 110b as a function of parameter 122.

In one exemplary embodiment, third-party trajectory planner 108b is parameterized as parameter 122, using an ego parameter 128. Ego parameter 128 may map, for example, an ego velocity of ego vehicle 100a. Likewise, ego parameter 128 may map a planned future ego trajectory 110a. Ego parameter 128 may represent, for example, a sequence of reference points to be approached by ego vehicle 100a in the future. Third-party trajectory planner 108b parameterized using ego parameter 128 then outputs third-party trajectories 110b in the area of ego trajectory 110a.

In one exemplary embodiment, third-party trajectory planner 108b is executed multiple times consecutively. Time parameter 124 is updated in each case according to a movement of ego vehicle 100a. Exact third-party trajectory 110b may thus continue to be obtained within a tolerance range, using third-party trajectory planner 108b created at an earlier time.

In other words, a system and a V2X protocol are provided for coordinating cooperative driving maneuvers via V2X, based on a transfer of maneuver planners.

Thanks to V2X (vehicle to everything) communication, vehicles may receive surroundings data from other vehicles or infrastructure equipment or even obtain a complete global surroundings model, to thereby enrich their own local surroundings model.

In addition to surroundings data, vehicles may exchange maneuver data to be able to plan and implement, e.g., cooperative driving maneuvers based thereon. Various approaches exist for coordinating driving maneuvers. For example, vehicles may exchange trajectories. Depending on the approach, the receiving vehicle may infer therefrom how the sending vehicle will behave and whether it wishes to carry out a particular maneuver.

Based on this information, the receiving vehicle may plan its maneuver and, if necessary, communicate its desired maneuver to other vehicles, which confirm it by adapting their own plans. Further methods may be based on so-called distributed state machines, via which cooperative maneuvers may be coordinated.

In the conventional procedure, redundant pieces of information may possibly be exchanged if trajectories greatly resemble each other in certain temporal sections. In addition, the communication complexity increases along with the length of the prediction horizon and the quantity of exchanged trajectories. In the case of restrictions in the communication channel, the latter may result in multiple communication rounds taking place before maneuvers may be successfully coordinated. If state machines are used, each possible maneuver is mapped in a state machine. Only a few situation classes may thus be implemented.

In the approach presented here, a new type of exchanged maneuver information between vehicles is described, with the aid of which cooperative maneuvers may be efficiently planned.

Instead of trajectories or pieces of synchronization information for a distributed state machine, software libraries (hereinafter referred to as reference planners) are exchanged, which, based on a (standardized) surroundings representation and a map, generate a set of possible and, if necessary, evaluated trajectories (e.g., with the aid of costs), which the vehicle is able to drive, due to the surroundings representation, as well as to drive in a preferential manner according to the costs. Instead of sharing a limited number of trajectories per V2X, the calculation rule is shared.

In the case of IP concerns relating to the sharing of the calculation rule, an encryption method may be used, or a neural network may be distributed, which ensures the functionality without specifically disclosing the calculation rule.

In one simple design, the reference planner may be event-driven, i.e., communicated only once to vehicles which have not yet received it (e.g., vehicles which have come into communication range of the sending vehicle for the first time). Otherwise, the cooperation may be subsequently confirmed or rejected on a one-time basis. A cancellation of the cooperation or an update of the reference planner due to an unfavorable change in the situation is furthermore possible.

With the aid of the reference planner, the receiving vehicle may generate an arbitrary number of trajectories for the vehicle where the reference planner originated to be able to infer the behavior of this vehicle for its own given maneuvers and vice versa. The quantity of trajectories for vehicles, for which a reference planner is present, is not limited by the communication, but only by the computing power. The latter is much more favorable than communication.

The described method may be combined, in that a reference planner is used for vehicles, for which such a planner exists, while, for vehicles for which no reference planner exists, the trajectories sent by these vehicles are taken into account in the vehicle's own maneuver planning.

DA (driver assistance) and AD (automated driving) systems are generally structured according to the sense/plan/act principle. This means that the vehicle first plans its behavior and then carries it out, based on the sensing of the surroundings. Once vehicles in addition to the ego vehicle (so-called traffic vehicles) are in the surroundings of the ego vehicle, it is necessary to infer the future behavior of these vehicles upon a given behavior of the ego vehicle and vice versa.

In classic systems, this behavior is inferred according to a special behavior and maneuver planner, which is generally designed to be significantly simpler than the planner of the ego vehicle. For a planning and coordination of cooperative maneuvers, the maneuvers of the traffic vehicles generated in this way are generally not the maneuvers which the traffic vehicle would plan for itself, because neither the destination of the traffic vehicle (in particular, in urban scenarios) nor its dynamic preferences are known.

This problem may be solved by exchanging trajectories between the vehicles. In contrast thereto, in the approach presented here, each vehicle generates a planner for the instantaneous situation and its instantaneous destination and distributes it to vehicles in its surroundings, to thereby enable the receiving vehicles to correctly predict/calculate the trajectories of the third-party vehicles. The planner may and should be provided with a simple design (e.g., planning only along the middle of the lanes or planning on a grid) to enable a rapid calculation of the trajectories and a low capacity utilization of the V2X channel for transferring the reference planner. Moreover, the interface to the planner may be defined and/or standardized (representation of the surroundings made available to the planner, as well as representation of the trajectories returned by the planner). Alternatively, the sending vehicle may transfer the interface definition together with the planner, e.g., in the form of a JSON file. The more the AD systems and their modules become a commodity, the less need will there be for IP protection and concealment of the algorithms used, by which the standardization thereof and the implementation of the method presented here will be made easier.

Finally, it should be noted that terms such as "having," "including," etc. do not exclude other elements or steps, and terms such as "a" or "one" do not exclude a plurality.

What is claimed is:

1. A method for communicating a parameterizable ego trajectory planner to at least one third-party vehicle, which is an autonomous vehicle and/or a semi-autonomously driving vehicle, the method comprising:
   communicating, via a device, the parameterizable ego trajectory planner to the at least one third-party vehicle, wherein the ego trajectory planner is configured to plan at least one ego trajectory of the ego vehicle;
   wherein the ego vehicle includes the device to communicate the parameterizable ego trajectory planner to the at least one third-party vehicle, and
   wherein the parameterizable ego trajectory planner generates pieces of maneuver information for possible future trajectories of the ego vehicle and/or the at least one third-party vehicle.

2. The method as recited in claim 1, wherein the ego trajectory planner is provided by the ego vehicle in coded form.

3. The method as recited in claim 1, wherein a simplified surroundings representation of surroundings of the ego vehicle is mapped in the ego trajectory planner.

4. The method as recited in claim 1, wherein multiple possible future ego trajectories are evaluated in the ego vehicle, and an evaluation of the ego trajectories is mapped in the ego trajectory planner for the third-party vehicle.

5. The method as recited in claim 1, wherein the pieces of maneuver information mapped in the ego trajectory planner for the third-party vehicle are simplified.

6. A method for communicating a parameterizable ego trajectory planner with at least one third-party vehicle, which is an autonomous vehicle and/or a semi-autonomously driving vehicle, the method comprising:
   parameterizing and executing, via a device, in an ego vehicle, a parameterizable third-party trajectory planner communicated with a third-party vehicle, using at least one time parameter, wherein the parameterizable third-party trajectory planner is configured to plan at least one future third-party trajectory of the third-party vehicle;
   wherein the ego vehicle includes the device to communicate the parameterizable ego trajectory planner with the at least one third-party vehicle, and
   wherein the trajectory planner generates pieces of maneuver information for possible future trajectories of the ego vehicle and/or the at least one third-party vehicle.

7. The method as recited in claim 6, wherein the third-party trajectory planner is parameterized and executed in the ego vehicle using at least one ego parameter of the ego vehicle.

8. The method as recited in claim 7, wherein the ego parameter characterizes a planned future ego trajectory of the ego vehicle.

9. The method as recited in claim 6, wherein, after the execution of the third-party trajectory planner, the time parameter is updated, and the third-party trajectory planner is re-parameterized and re-executed in the ego vehicle, using the updated time parameter, to obtain an updated future third-party trajectory of the third-party vehicle.

10. The method as recited in claim 6, wherein the third-party trajectory planner is received from the third-party vehicle in coded form and is decoded prior to the parameterization and the execution in the ego vehicle.

11. A method for communicating a parameterizable ego trajectory planner with at least one third-party vehicle, which is an autonomous vehicle and/or semi-autonomously driving vehicle, the method comprising:
   communicating, via device, a parameterizable ego trajectory planner to at least one third-party vehicle, wherein the ego trajectory planner is configured to plan at least one ego trajectory of the ego vehicle; and executing, in the ego vehicle, at least one parameterizable third-party trajectory planner communicated from the third-party vehicle for planning at least one future third-party trajectory of the third-party vehicle;

wherein the ego vehicle includes the device to communicate the parameterizable ego trajectory planner to the at least one third-party vehicle, and wherein the parameterizable ego trajectory planner generates pieces of maneuver information for possible future trajectories of the ego vehicle and/or the at least one third-party vehicle.

12. A device for communicating a parameterizable ego trajectory planner with at least one third-party vehicle, which is an autonomous vehicle and/or a semi-autonomously driving vehicle, comprising:

a device configured to perform the following:
communicating, via the device, the parameterizable ego trajectory planner to at least one third-party vehicle, wherein the ego trajectory planner is configured to plan at least one ego trajectory of the ego vehicle;

wherein the ego vehicle includes the device to communicate the parameterizable ego trajectory planner to the at least one third-party vehicle, and wherein the parameterizable ego trajectory planner generates pieces of maneuver information for possible future trajectories of the ego vehicle and/or the at least one third-party vehicle.

13. A device for communicating a parameterizable ego trajectory planner with at least one third-party vehicle, which is an autonomous vehicle and/or a semi-autonomously driving vehicle, comprising:

a device configured to perform the following:

parameterizing and executing, via a device, in an ego vehicle, the parameterizable third-party trajectory planner communicated with a third-party vehicle, using at least one time parameter, wherein the parameterizable third-party trajectory planner is configured to plan at least one future third-party trajectory of the third-party vehicle;

wherein the ego vehicle includes the device to communicate the parameterizable ego trajectory planner with the at least one third-party vehicle, and wherein the parameterizable ego trajectory planner generates pieces of maneuver information for possible future trajectories of the ego vehicle and/or the at least one third-party vehicle.

14. A non-transitory machine-readable storage medium, on which is stored a computer program, which is executable by a processor, comprising:

a program code arrangement having program code for communicating a parameterizable ego trajectory planner with at least one third-party vehicle, which is an autonomous vehicle and/or a semi-autonomously driving vehicle, by performing the following:

communicating, via a device, the parameterizable ego trajectory planner for at least one third-party vehicle, wherein the ego trajectory planner is configured to plan at least one ego trajectory of the ego vehicle;

wherein the ego vehicle includes the device to communicate the parameterizable ego trajectory planner with the at least one third-party vehicle, and wherein the parameterizable ego trajectory planner generates pieces of maneuver information for possible future trajectories of the ego vehicle and/or the at least one third-party vehicle.

* * * * *